US006924959B1

(12) United States Patent
Melkote et al.

(10) Patent No.: US 6,924,959 B1
(45) Date of Patent: Aug. 2, 2005

(54) REDUCING ESTIMATION PERIOD FOR REPEATABLE RUNOUT ERRORS IN A DISK DRIVE

(75) Inventors: Hemant Melkote, San Jose, CA (US); Robert J. McNab, San Jose, CA (US); David D. Nguyen, Fountain Valley, CA (US); John Yin Kwong Li, Laguna Niguel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 133 days.

(21) Appl. No.: 10/651,408

(22) Filed: Aug. 29, 2003

(51) Int. Cl.[7] .............................................. G11B 5/596
(52) U.S. Cl. ................................................. 360/77.04
(58) Field of Search .............................. 360/77.04, 75, 360/77.02, 77.07, 77.08

(56) References Cited

U.S. PATENT DOCUMENTS

| | | | | |
|---|---|---|---|---|
| 6,310,742 B1 * | 10/2001 | Nazarian et al. | ......... | 360/77.04 |
| 6,563,663 B1 | 5/2003 | Bi et al. | .................. | 360/77.04 |
| 6,831,803 B2 * | 12/2004 | Hsin | ........................ | 360/77.04 |
| 6,847,503 B2 * | 1/2005 | Zhang et al. | ............. | 360/77.04 |
| 6,859,341 B2 * | 2/2005 | Min et al. | ................. | 360/77.04 |
| 2004/0228026 A1 * | 11/2004 | Chang et al. | ............. | 360/77.04 |
| 2004/0246619 A1 * | 12/2004 | Zhang | ..................... | 360/77.04 |

* cited by examiner

*Primary Examiner*—David Hudspeth
*Assistant Examiner*—James L Habermehl
(74) *Attorney, Agent, or Firm*—Ramin Mobarhan, Esq.

(57) ABSTRACT

A method for reducing an estimation period for repeatable runout (RRO) errors in a disk drive comprising a head, a disk surface having a track partitioned by servo-wedges, and a servo control system for controlling the movement of the head relative to a track during revolutions of the disk. The method includes estimating the RRO errors of the track based on a) a series of position error signal values obtained during a current revolution of the disk surface, and b) a previous estimation of the RRO errors of the track obtained during a previous revolution of the disk surface and determining a differential value between a first measure of the estimated RRO errors and a second measure of the previous estimation of RRO errors, and repeating the estimating and determining for subsequent revolutions of the disk surface until the determined differential value is smaller than a pre-selected threshold value.

15 Claims, 5 Drawing Sheets

REDUCING ESTIMATION PERIOD FOR REPEATABLE RUNOUT ERRORS IN A DISK DRIVE

FIELD OF THE INVENTION

This invention relates to repeatable runout errors in a disk drive system. More particularly, the present invention is directed to a method for reducing estimation time period for the repeatable runout errors by a disk drive system.

BACKGROUND OF THE INVENTION

Disk drives are commonly employed in workstations, personal computers, portables and other computer systems to store large amounts of data in a readily-available form. A disk drive comprises a head stack assembly (HSA) having a head element which hovers near a disk surface during the rotation of the disk to perform read/write operations on the disk surface. The read/write operations are performed on concentric tracks formed on the disk surface on which the data is stored. For a successful read/write operation to occur, the head must be properly positioned over a desired track and to remain on track while the read/write operation is performed. During the read/write operations, however, various types of errors and other factors may cause the head to become off-track so a periodic determination of the position of the head relative to the track is also performed. The determination is based on a set of embedded servo-fields, such as servo-wedges, that are formed on the disk surface during manufacturing. The servo-fields partition the tracks at regular intervals and provide information to a disk drive control system which uses the information to determine the position of the head relative to a track and, in case of an off-track determination, attempts to move the head to an on-track position.

One class of errors which causes the head to apparently become off-track during the read/write operations is known as repeatable runout. The repeatable runout errors occur because a servo track was not formed as a perfect circular path on the disk surface, thus causing a track's path to deviate in respect to the stationary head positioned near the track during the disk rotations. Because the path's imperfection—i.e. runout—is permanently stored in the written servo track, the imperfection is repeatable. If the disk drive control system attempts to follow the imperfect path of the servo track the servo system may be challenged to maintain control of the head position within desired limits.

Currently, one common method to compensate for the repeatable runout errors is by estimating the runout components of each track in an iterative fashion and storing compensation values based on the estimation. The compensation values are then used to distinguish between actual off-track motion of the head and apparent motion owing to the runout. Unfortunately, since each track potentially has unique runout characteristics, the process is time consuming, particularly since each generation of disk drive areal density adds thousands of tracks to the disk surface.

Accordingly, what is needed is a method for reducing the time required for estimating repeatable runout errors in a disk drive.

SUMMARY OF THE INVENTION

This invention can be regarded as a method for reducing an estimation period for repeatable runout (RRO) errors in a disk drive comprising a head, a disk surface having a track partitioned by a plurality of servo-wedges, and a servo control system for controlling the movement of the head relative to a track during revolutions of the disk. The method includes estimating the RRO errors of the track based on a) a series of position error signal values obtained during a current revolution of the disk surface, and b) a previous estimation of the RRO errors of the track obtained during a previous revolution of the disk surface and determining a differential value between a first measure of the estimated RRO errors and a second measure of the previous estimation of the RRO errors. The method further includes repeating the estimating and determining for subsequent revolutions of the disk surface until the determined differential value is smaller than a pre-selected threshold value.

DETAILED DESCRIPTION OF THE INVENTION

Figure 1:
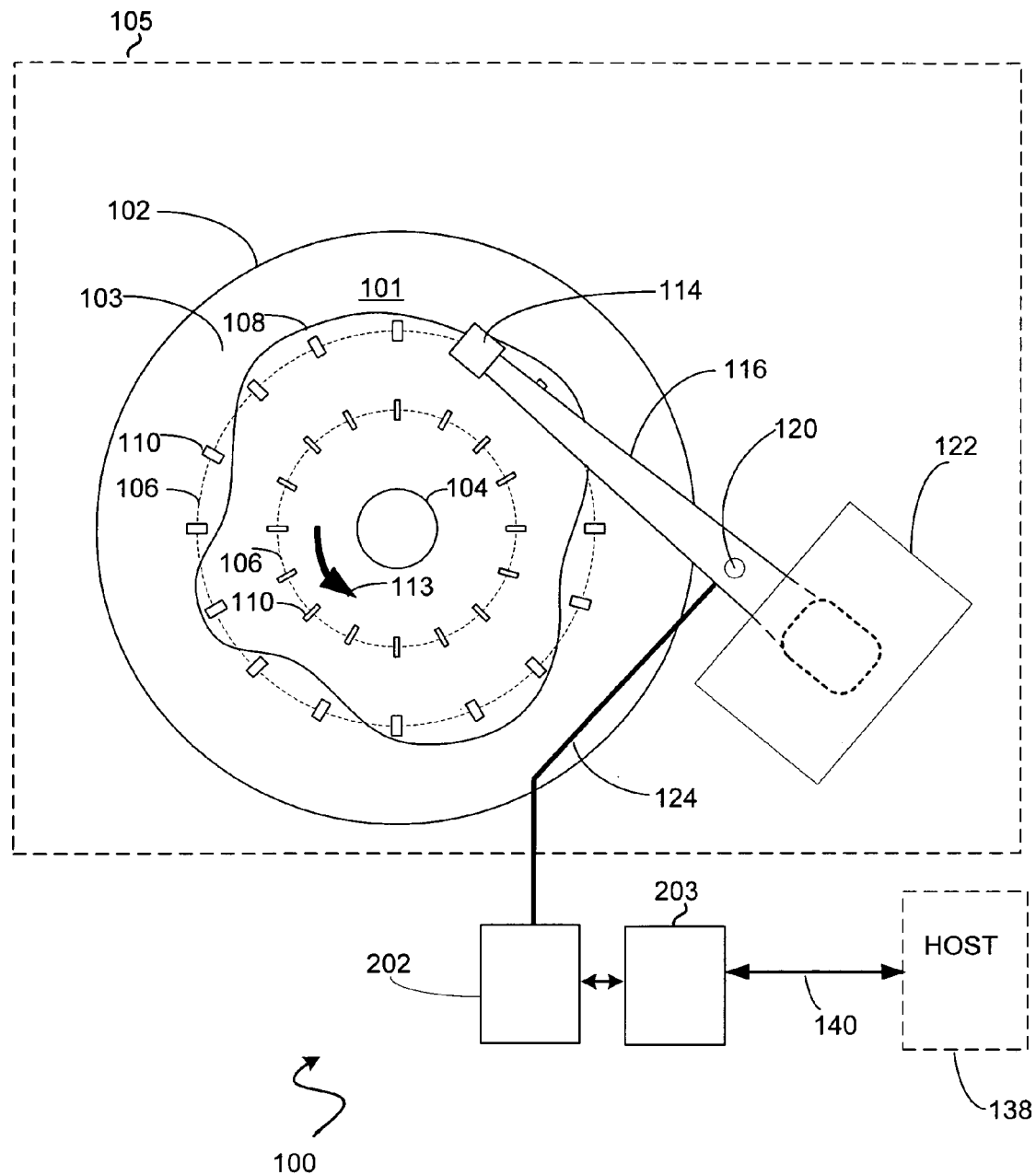
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 formed on each surface 103 of a disk 102. The disks 102 are suitably organized into concentric magnetic domains which include servo tracks 106 defined by servo wedges 110 that are equally spaced from an axis of a spindle 104 about which the disk 102 rotates. The servo wedges 110 on a given track 106 are spaced circumferentially in a periodic manner and provide positional information used by a voice coil motor servo system (not shown) during reading and writing operations, and seeking and settling operations.

The HDA 105 further comprises a transducer head 114 mounted on a rotary actuator 116 that rotates about a pivot 120 via controlled torques applied by a voice coil motor (VCM) 122. A signal bus 124, such as a flex cable, interconnects the HDA 105 to a servo control system 202 which can control the movement of the actuator 116 in a manner well known in the art. In addition, the servo control system 202 sends to and receives signals from the head 114 during read and write operations performed on the disk 102. As also shown in FIG. 1 the servo control system 202 is interconnected to the interface control system 203 which is in turn interconnected to a host computer 138 by a bus 140 for transferring of data between the hard disk drive 100 and the host 138.

While the disk drive 100 is in operation, the disk 102 rotates in an exemplary direction 113 about the axis of the spindle 104 at a substantially fixed angular speed such that the surface 103 of the disk 102 moves relative to the head 114. The head's radial position on the disk 102 is changeable by the rotation of the actuator 116 for positioning of the head 114 over a desired servo track 106. The head's radial and circumferential position on the disk 102 is determined by reading the information contained in the servo wedges 110 in a manner well known in the art. Once the head 114 is positioned on a desired servo track 106 within desirable limits, data can be written to or read from portions of servo tracks 6 located between the servo wedges 110.

FIG. 1 further illustrates a servo track 108 which due to manufacturing errors was not formed as a perfect circular path of a desired track 106. The imperfection causes the head 114 to apparently become off-track during the read/write operations, causing a class of errors known as repeatable runout. The repeatable runout errors cause a track's path to deviate in respect to the stationary head 114 positioned near the track 108 during the disk rotations. Because the path's imperfection—i.e. runout—is permanently stored in the written servo track, the imperfection is repeatable. If the servo control system 202 attempts to follow the imperfect path of the servo track 108 the servo control system 202 may be challenged to maintain control of the head position within desired limits.

Currently, one common method to compensate for the repeatable runout errors is by estimating the runout components of each track 108 in an iterative fashion and storing compensation values based on the estimation, as described in the U.S. Pat. No. 6,141,175 entitled "Repeatable runout cancellation in sectored servo disk drive positioning system", herein incorporated by reference. The compensation values are then used to distinguish between actual off-track motion of the head 114 and apparent motion owing to the runout. Unfortunately, since each track potentially has unique runout characteristics, the process is time consuming, particularly since each generation of disk drive areal density adds thousands of tracks to the disk surface.

Figure 2:
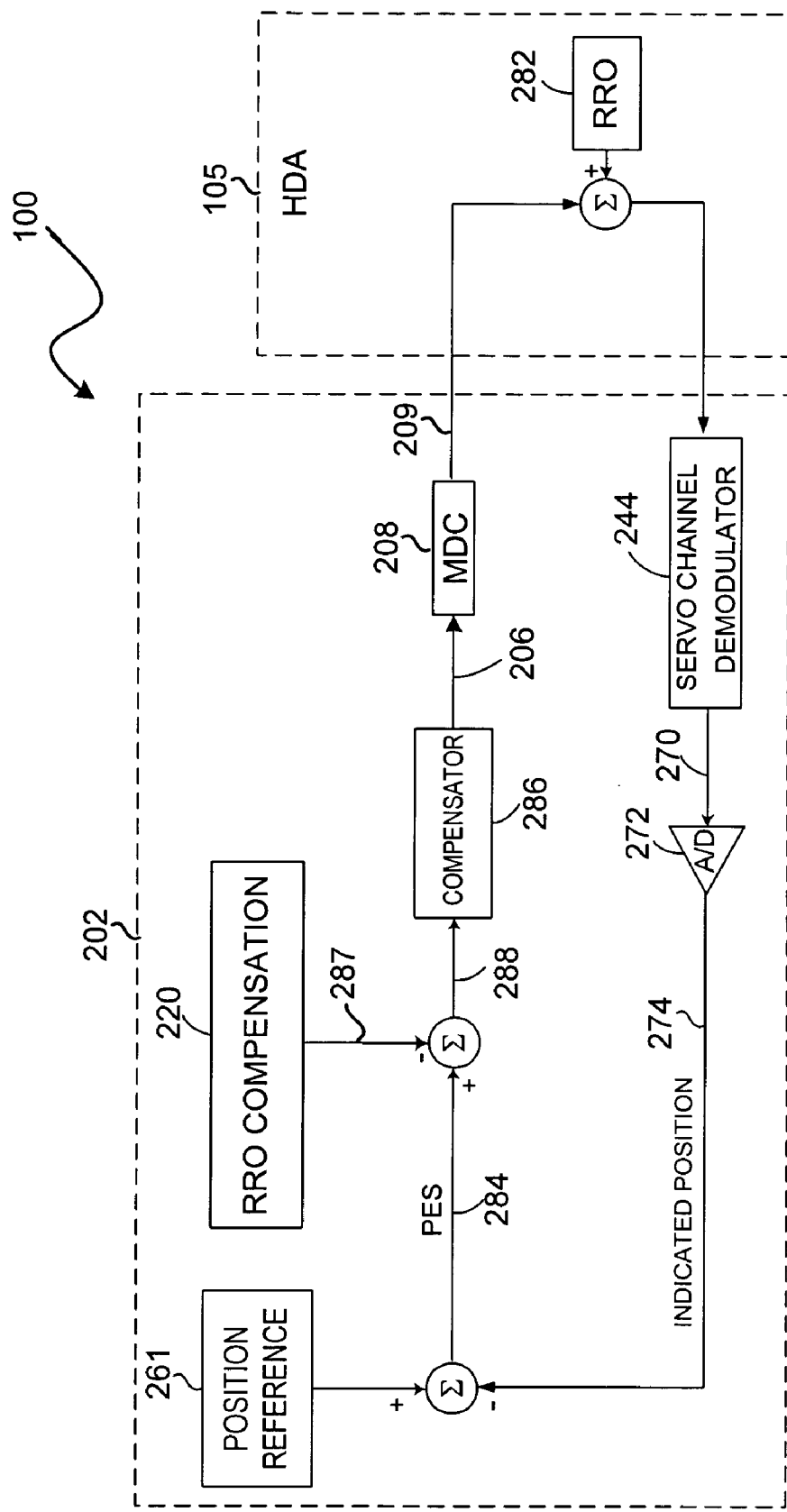
FIG. 2 illustrates a diagram of an exemplary servo system of the disk drive shown in FIG. 1.

FIG. 2 illustrates a diagram of an exemplary servo control system 202 in a disk drive 100 in which the method of the present invention for reducing estimation time period for the repeatable runout errors may be practiced. As shown in FIG. 2, the servo control system 202 comprises a motor driver circuit 208 (MDC) to provide an operating current 209 to the HDA 105 based on a received a series of command effort signals 206 so to maintain the head 114 over a desired servo track 108. As described above, imperfections in a track 108 may cause the RRO deviations 282 to the head 114, causing the head 114 to become off-track during the read/write operations. Suitably, the location of head 114 is concurrently monitored by a servo channel demodulator 244 which outputs an analog signal 270 corresponding to the location of head 114 that is typically converted to a digital signal 274 by an analog to digital converter (ADC) 272. The digital signal 274 corresponds to an indicated track position and off-track percentage value. The digital signal 274 is then combined with a signal corresponding to a position reference 261 to generate a position error signal (PES) 284. The PES 284 is then combined with the estimated RRO compensation values 287 of the present invention that are stored in the RRO compensation table 220, as described in greater detail in conjunction with FIGS. 3–5 below. Combining the estimated RRO compensation values 287 with the PES 284 reduces the effects of RRO deviations 282 on the PES 284. A compensated signal 288 is then generated and fed into the compensator 286, which determines the command effort signals 206.

Figure 3:
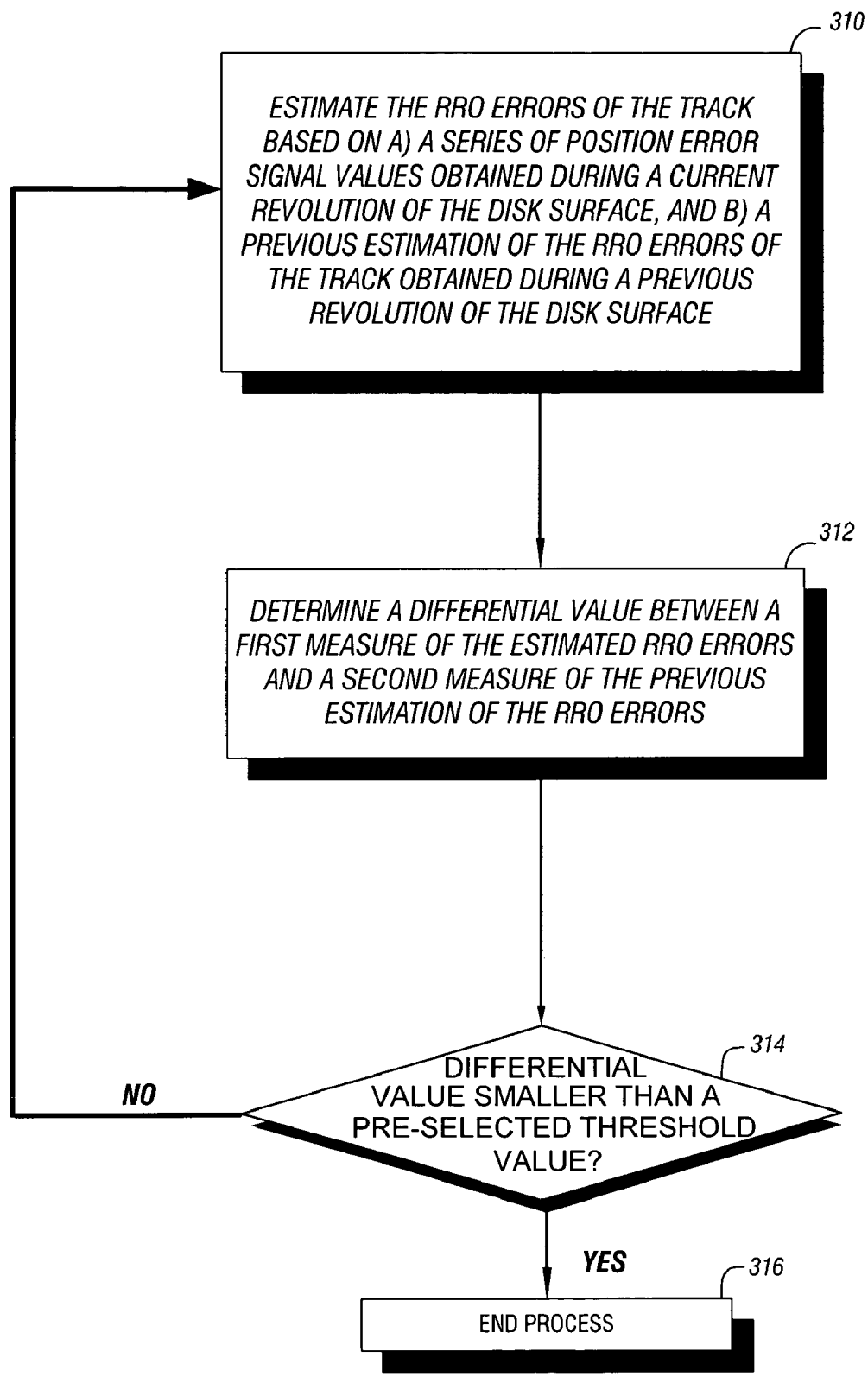
FIG. 3 is a flow chart illustrating a process used in an embodiment of the invention.

FIG. 3 is a flow chart illustrating a process used in an embodiment of the invention for estimating the RRO compensation values 287. As shown, the process begins in block 310 where the RRO errors of the track 108 are estimated based on a) a series of position error signal values obtained during a current revolution of the disk surface 103 and b) a previous estimation of the RRO errors of the track obtained during a previous revolution of the disk surface 103. Suitably, the previous estimation of the RRO errors of the track 108 is based on a series of position error signal values obtained during the previous revolution, or a plurality of previous revolutions, of the disk surface 103. Suitably, the previous revolution is the revolution immediately preceding the current revolution. The estimation of the RRO errors is well known in the art, such as described in the above referenced patent.

Next, in block 312, a differential value between a first measure of the estimated RRO errors and a second measure of the previous estimation of the RRO errors is determined, as described in greater detail below in conjunction with FIGS. 4–5. Next, in decision block 314, if it is determined that the differential value is not smaller than a pre-selected threshold value, then the flow proceeds back to block 310 and then to block 312 where the estimating and determining is repeated for a subsequent revolution of the disk surface 103. The repeating of the estimating and determining continues until the determined differential value is smaller than a pre-selected threshold value in which case the flow proceeds to block 316 where the overall process ends. Suitably, the pre-selected threshold value is based on the number of servo-wedges 110 in the track 108. In one embodiment of the present invention, the plurality of servo-wedges 110 is in the range of 164 to 180 servo-wedges 110 and the pre-selected threshold value is approximately 200. In another embodiment of the present invention, the plurality of servo-wedges 110 is in the range of 240 to 260 servo-wedges 110 and the pre-selected threshold value is approximately 252.

Figure 4:
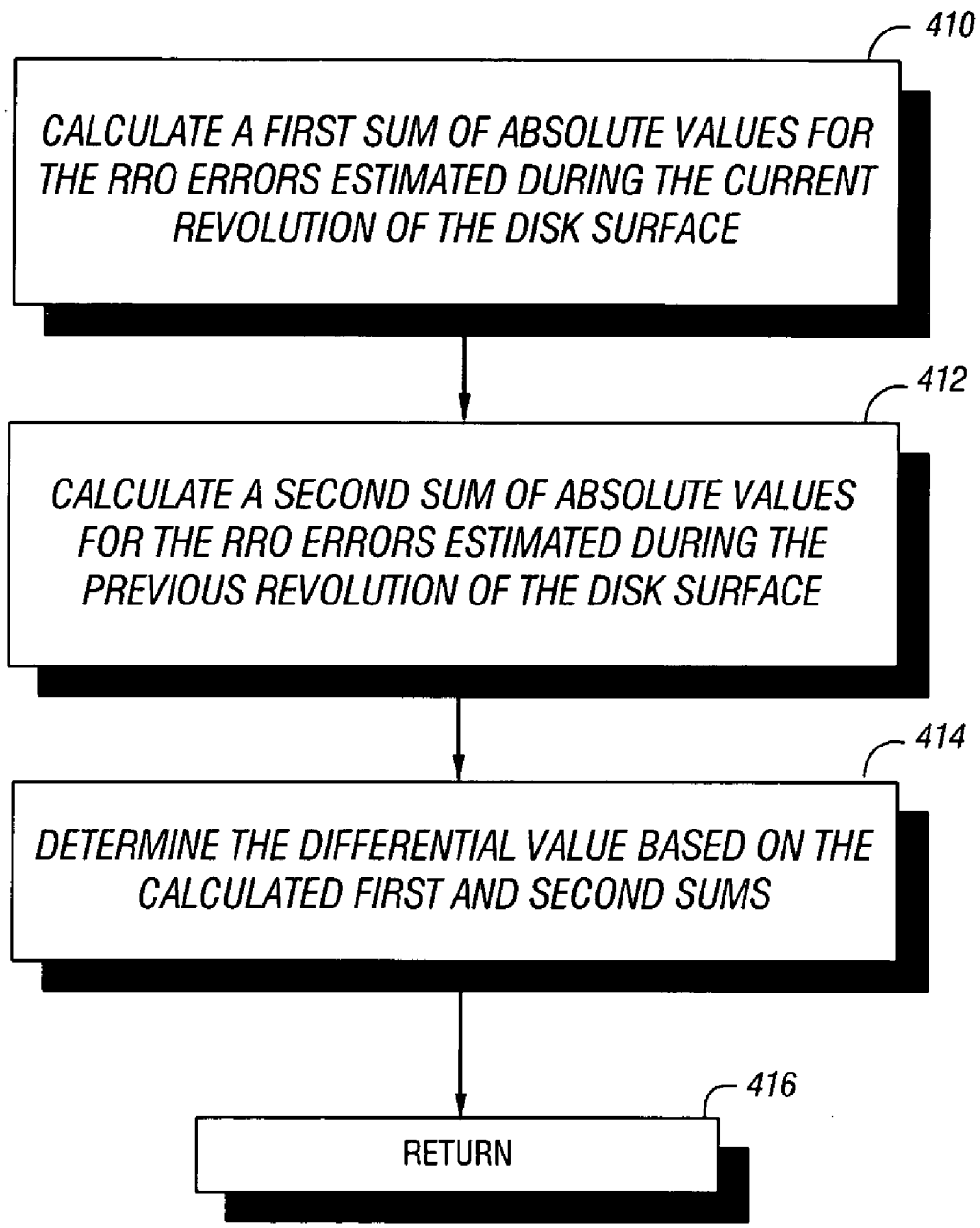
FIG. 4 is a flow chart further illustrating the process used in the embodiment of the invention shown in FIG. 3.

FIG. 4 illustrates in greater detail the determining process in block 312 of FIG. 3. As shown, the process begins in block 410 where the first measure of the estimated RROs is calculated based on a sum of absolute values for the RRO errors estimated during the current revolution of the disk surface 103. Suitably the absolute values for the RRO errors estimated during the current revolution of the disk surface are digital count expressions, such as the count of the A/D 272. Next, in block 412, the second measure of the previous estimation of the RRO errors is calculated based on a sum of absolute values for the RRO errors estimated during the previous revolution of the disk surface 103. Suitably, the absolute values for the RRO errors estimated during the previous revolution of the disk surface are digital count expressions, such as the count of the A/D 272. Next, in block 414, the differential value based on the calculated first and second sums is determined. The flow then proceeds to block 416 for returning to block 312 of FIG. 3.

The process of FIG. 4 may be represented by the following exemplary Equation 1:

$$\delta_k = \sum_{t=1}^{N} |u_k(t)| - \sum_{t=1}^{N} |u_{k-1}(t)| \qquad \text{Equation 1}$$

where each of k and k−1 respectively represent a current and a previous revolution of the disk surface 103, t represents a servo-wedge 110, N represents the total number of servo-wedges 110 on a track 108, $$\sum_{t=1}^{N}|u_k(t)|$$

represents the summation performed on the absolute values for the estimated RRO errors during a current revolution (i.e. k) of the disk surface, and $$\sum_{t=1}^{N}|u_{k-1}(t)|$$

represents the summation performed on the absolute values for the estimated RRO errors during a previous revolution (i.e. k−1) of the disk surface. The differential value of the summations is shown as $\delta_k$. It should be noted that the sequence of mathematical operations as shown in FIG. 9 and illustrated in the provided Equation 1 is meant to be exemplary only and any rearrangement of the foregoing sequence of the mathematical operations which results in the calculation of a differential value is contemplated to be within the scope of the present invention.

Figure 5:
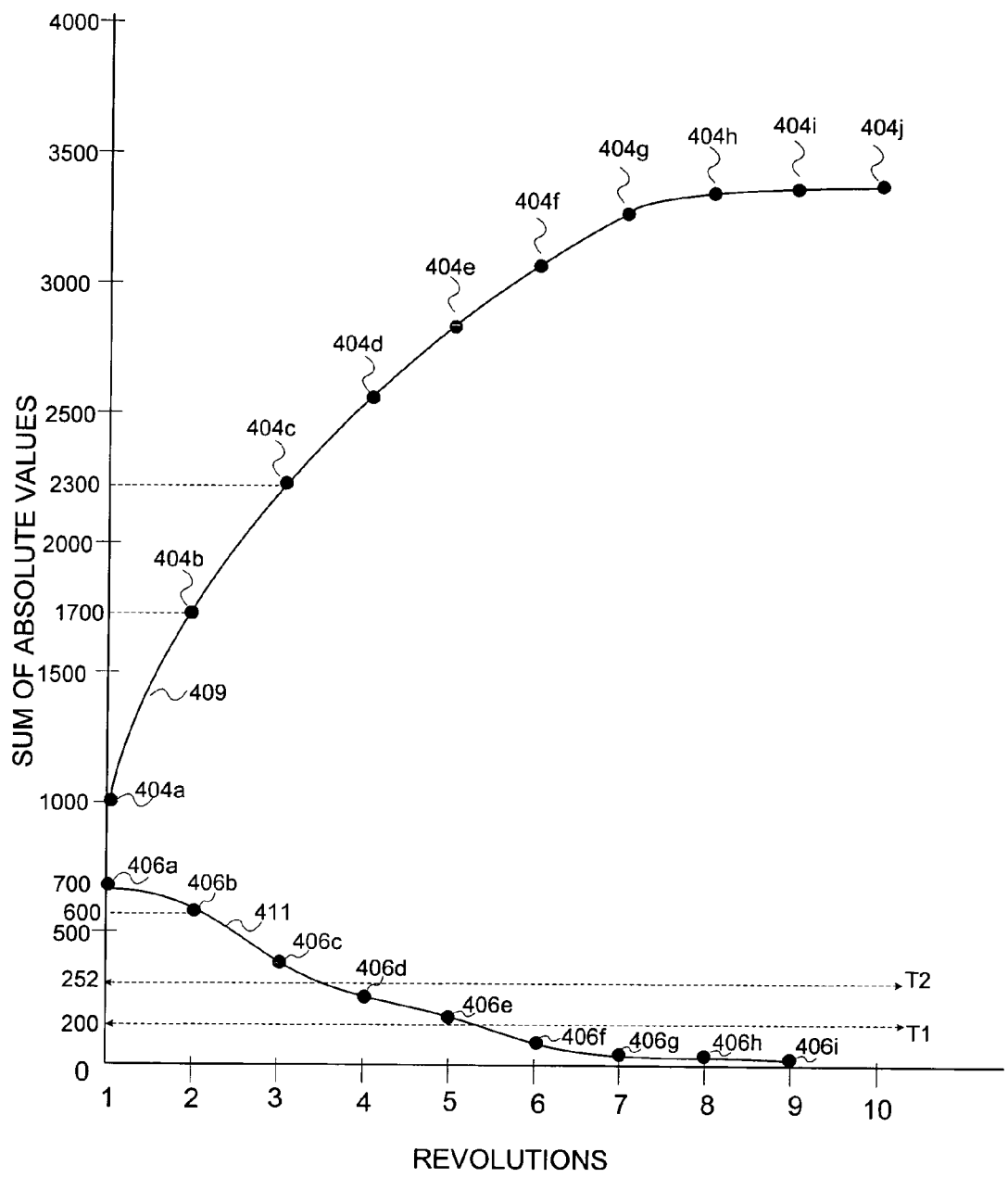
FIG. 5 illustrates an exemplary estimation of the RRO errors in the disk drive of FIG. 1 using the process of the present invention shown in FIGS. 3–4.

For ease of illustration, an exemplary estimation of the RRO errors in the disk drive 100 using the process of the present invention is shown in FIG. 5 and used throughout the detailed description in conjunction with FIGS. 3–4. As shown in FIG. 5, a sum of absolute values for the RRO errors is plotted against revolutions of the disk surface 13. For simplicity of illustration, only ten revolutions are used in the example. Line 409 represents the calculated measures in the form of dots 404a through 404j. As shown by dot 404b, during the second revolutions of the disk surface 103 the first measure of the estimated RROs is calculated to be at 1700 based on a sum of absolute values for the RRO errors estimated during the second revolution of the disk surface 103. The second measure of the previous estimation of the RRO errors, shown by dot 404a, is calculated to be at 1000 based on a sum of absolute values for the RRO errors estimated during the first revolution of the disk surface 103. The differential value of the calculated first and second sums is therefore 700, as shown by dot 406a in line 411 whose dots 406a–406i represents the corresponding differential values for each revolution of the disk surface 103.

Returning to FIG. 3, in block 314 it is determined if the differential value 700 is smaller than a pre-selected threshold value, such as T1 value of 200 in one embodiment, or T2 value of 252 in another embodiment, as shown in FIG. 5. For simplicity, only the T2 value of 252 will be used in the above example. Since the differential value of 700 is not smaller than 252, the flow in FIG. 3 is returned to block 310 and then to block 312 where the estimating and determining is repeated for a third revolution of the disk surface 103. Performing the process of FIG. 4 for the third revolution, the first measure of the estimated RROs is calculated to be at 2300 as shown by dot 404c, and the second measure of the previous estimation of the RRO errors, shown by dot 404b, was calculated to be at 1700. The differential value of the calculated first and second sums is therefore 600, as shown by dot 406b in line 411. Since differential value of 600 is still not smaller than 252, the flow in FIG. 3 is returned to block 310 and then to block 312 where the estimating and determining is repeated for a fourth revolution whose differential value is shown by dot 406c that remains above the T2 line. Subsequently a fifth revolution of the disk surface 103 takes place and as shown by dot 406d, the differential value becomes smaller than the T2 threshold value of 252, in which case the flow proceeds to block 316 of FIG. 3 where the overall process ends. An estimation of the RRO errors for a track 108 was thus obtained after only five revolutions of the disk surface 103 as opposed to ten revolutions if a fixed number of for example ten revolutions had been used for the estimation process.

One advantage of the foregoing feature of the present invention over the prior art is that by iteratively determining differential values for a track and comparing them to a pre-selected threshold value for the track, the time required for estimating repeatable runout errors in a disk drive is reduced.

In one embodiment of the present invention, the disk surface 103 comprises a plurality of tracks 108 partitioned by a plurality of servo-wedges, 110 and wherein the estimating the determining and the repeating process shown respectively in blocks 310, 312 and 314 of FIG. 3 is performed for each track 108 in the plurality of tracks 108. In another embodiment of the present invention, the disk surface 103 comprises a plurality of tracks 108 partitioned by a plurality of servo-wedges 110, and wherein the estimating the determining and the repeating process shown respectively in blocks 310, 312 and 314 of FIG. 3 is performed for each track 108 in a subset of the plurality of tracks 108.

One advantage of the foregoing feature of the present invention over the prior art is that by iteratively determining differential values for each track and comparing them to a pre-selected threshold value, the time required for estimating repeatable runout errors in a disk drive is reduced.

It should be noted that the various features of the foregoing embodiment were discussed separately for clarity of description only and they can be incorporated in whole or in part into a single embodiment of the invention having all or some of these features.

What is claimed is:

1. A method for reducing an estimation period for repeatable runout (RRO) errors in a disk drive comprising a head, a disk surface having a track partitioned by a plurality of servo-wedges, and a servo control system for controlling the movement of the head relative to a track during revolutions of the disk, the method comprising:

estimating the RRO errors of the track based on a) a series of position error signal values obtained during a current revolution of the disk surface, and b) a previous estimation of the RRO errors of the track obtained during a previous revolution of the disk surface;

determining a differential value between a first measure of the estimated RRO errors and a second measure of the previous estimation of the RRO errors; and repeating the estimating and determining for subsequent revolutions of the disk surface until the determined differential value is smaller than a pre-selected threshold value.

2. The method as claimed in claim 1, wherein the previous estimation of the RRO errors of the track is based on a series of position error signal values obtained during the previous revolution of the disk surface.

3. The method as claimed in claim 2, wherein the previous estimation of the RRO errors of the track is based on a series of position error signal values obtained during a plurality of previous revolutions of the disk surface.

4. The method as claimed in claim 3, wherein the first measure comprises:

calculating a first sum of absolute values for the RRO errors estimated during the current revolution of the disk surface.

5. The method as claimed in claim 4, wherein the second measure comprises:

calculating a second sum of absolute values for the RRO errors estimated during the previous revolution of the disk surface.

6. The method as claimed in claim 5, wherein the determining further comprises:

determining the differential value based on the calculated first and second sums.

7. The method as claimed in claim 6, wherein the pre-selected threshold value is based on the number of servo-wedges in the plurality of the servo-wedges in the track.

8. The method as claimed in claim 7, wherein the absolute values for the RRO errors estimated during the current revolution of the disk surface are digital count expressions.

9. The method as claimed in claim 8, wherein the absolute values for the RRO errors estimated during the previous revolution of the disk surface are digital count expressions.

10. The method as claimed in claim 9, wherein the plurality of servo-wedges is in the range of 164 to 180 servo-wedges.

11. The method as claimed in claim 10, wherein the pre-selected threshold value is approximately 200.

12. The method as claimed in claim 9, wherein the plurality of servo-wedges is in the range of 240 to 260 servo-wedges.

13. The method as claimed in claim 12, wherein the pre-selected threshold value is approximately 252.

14. The method as claimed in claim 1, wherein the disk surface comprises a plurality of tracks partitioned by a plurality of servo-wedges, and wherein the estimating the determining and the repeating is performed for each track in the plurality of tracks.

15. The method as claimed in claim 1, wherein the disk surface comprises a plurality of tracks partitioned by a plurality of servo-wedges, and wherein the estimating the determining and the repeating is performed for each track in a subset of the plurality of tracks.

* * * * *